(12) United States Patent
Tajima et al.

(10) Patent No.: US 7,017,348 B2
(45) Date of Patent: Mar. 28, 2006

(54) CONTROL DEVICE FOR A HYBRID VEHICLE

(75) Inventors: Yoichi Tajima, Anjo (JP); Yoshitaka Murase, Anjo (JP); Takayuki Kubo, Anjo (JP); Takeshi Inuzuka, Anjo (JP); Yasuhiko Kobayashi, Anjo (JP); Shigeki Takami, Anjo (JP); Takahiro Kido, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 180 days.

(21) Appl. No.: 10/803,947

(22) Filed: Mar. 19, 2004

(65) Prior Publication Data
US 2004/0235614 A1     Nov. 25, 2004

(30) Foreign Application Priority Data
Apr. 9, 2003    (JP)    ............... 2003-105572

(51) Int. Cl.
*F01B 21/14*    (2006.01)
(52) U.S. Cl. .............. 60/706; 60/716; 60/719
(58) Field of Classification Search ........... 60/706, 60/709, 716, 718, 719
See application file for complete search history.

(56) References Cited

U.S. PATENT DOCUMENTS 6,369,531 B1*  4/2002  Oshima et al. ............. 318/139
6,732,526 B1*  5/2004  Minagawa et al. .......... 60/706
6,751,960 B1*  6/2004  Arimitsu et al. ........... 60/706
2004/0152558 A1*  8/2004  Takami et al. ............. 477/3

FOREIGN PATENT DOCUMENTS

JP    A 09-215270    5/1997

* cited by examiner

*Primary Examiner*—Hoang Nguyen
(74) *Attorney, Agent, or Firm*—Oliff & Berridge, PLC

(57) ABSTRACT

A control device for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the control device including a request output detection unit that detects a driver's requested output; an engine control unit that controls the engine output; a motor control unit that controls motor output so that total output of the motor output and the engine output becomes the driver's requested output; and a limitation request output unit that, when the driver's request output is larger than input-available driving force to the input shaft of the automatic transmission, outputs a limitation request to limit the total output to limitation output, which is smaller than or equal to the input-available driving force, wherein the motor control unit, when the limitation request is output by the limitation request output unit, controls the motor output so that the total output of the motor output and the engine output becomes the limitation output.

25 Claims, 8 Drawing Sheets

|      | C1 | C2 | C3 | B1 | B2 | B3 | B4 | B5 | F1 | F2 |
|------|----|----|----|----|----|----|----|----|----|----|
| N    |    |    |    |    |    |    |    | ○  |    |    |
| 1ST  | ○  |    |    |    |    | △  |    | ○  |    | ○  |
| 2ND  | ○  |    |    | △  | ○  |    |    | ○  | ○  |    |
| 3RD  | ○  |    |    | △  | ○  |    | ○  |    | ○  |    |
| 4TH  | ○  |    | ○  | △  | ○  |    |    |    | ○  |    |
| 5TH  | ○  | ○  | ○  |    |    |    |    |    |    |    |
| REV  |    | ○  |    |    |    | ○  |    | ○  |    |    |

FIG. 2(B)

CONTROL DEVICE FOR A HYBRID VEHICLE

CROSS-REFERENCE TO RELATED APPLICATION

The disclosure of Japanese Patent Application No. 2003-105572 filed Apr. 9, 2003, including the specification, drawings, and claims is incorporated herein by reference in its entirety.

BACKGROUND OF THE INVENTION

1. Field of Invention

This invention relates to a control device for a hybrid vehicle, which is controlled so that the total output of an engine and a motor becomes the requested output of the driver.

2. Description of Related Art

In recent years, due to consideration of environmental problems, various types of hybrid vehicles, which include an engine and a motor as driving sources, have been provided. Among these hybrid vehicles, a so called directly connected parallel type hybrid vehicle, which, for example, connects a rotor of the motor to a crankshaft of the engine and inputs a driving force of the engine and the motor into an automatic transmission, has been proposed (Japanese laid open patent H9-215270).

An automatic transmission sometimes requires limitation of the engine torque, so that the engine torque becomes the torque available for input to the automatic transmission, to protect the automatic transmission. Such occasions include, for example, a situation when the capacity of a clutch to transmit a driving force is reduced due to a torque amplification effect of a torque converter at the time of the start of the vehicle and due to a reduced oil pressure at the time of low engine revolution and a situation when a capacity of a lock-up clutch to transmit a driving force is reduced at the time of reducing a vehicle speed.

In such an engine torque limitation, particularly when the engine torque is larger than a limitation torque, for example, the engine torque can be reduced to the limitation torque by delaying ignition timing of the engine. However, the reduction of the engine torque by delaying ignition timing destabilizes a combustion condition of the engine and generates unburned gas. Further, it is feared that it has adverse effects on auto emissions.

Furthermore, in the above mentioned hybrid vehicle, generally, the vehicle runs by the driving force of the engine and is assisted by the motor when the requested output of the driver is large. The motor operates in a regeneration mode when the vehicle decelerates. In other words, the motor is used secondarily to the engine. In such a hybrid vehicle, according to the output ability of the motor, the engine is driven so that the engine operates in the best (i.e., the most appropriate) condition for fuel consumption, on the basis of the revolution speed of the engine, regardless of a requested output of the driver. The motor outputs the amount necessary to compensate for an insufficient engine output in comparison to the requested output. On the other hand, when the engine output is large, the motor operates in the regeneration mode when the amount of the engine output is greater than the requested output. In this way, the vehicle can provide the requested output of the driver.

However, when the abovementioned limitation of the engine torque is performed, the most appropriate condition for fuel consumption based on the revolution speed of the engine is not achieved. Therefore, an improvement in fuel consumption is not provided.

SUMMARY OF THE INVENTION

One object of the invention is to provide a control device for a hybrid vehicle, which can limit the total output of an engine and a motor to a limited output, less than or equal to a torque available for input to an automatic transmission, by controlling the output of a motor by a motor control means.

Another object of the invention is to provide a control device for a hybrid vehicle which can control an engine so that the engine operates in the most appropriate condition for fuel consumption, even when total output of the engine and a motor is limited to a limited output, that is less than or equal to the torque available for input to the automatic transmission An exemplary embodiment is directed to a control device for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the control device comprising a request output detection unit that detects a driver's requested output; an engine control unit that controls the engine output; a motor control unit that controls motor output so that total output of the motor output and the engine output becomes the driver's requested output; and a limitation request output unit that, when the driver's requested output is larger than input-available driving force to the input shaft of the automatic transmission, outputs a limitation request to limit the total output to a limitation output, which is smaller than or equal to the input-available driving force, wherein the motor control unit, when the limitation request is output by the limitation request output unit, controls the motor output so that the total output of the motor output and the engine output becomes the limitation output.

The embodiment includes a control method for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the method comprising detecting a driver's requested output; controlling the engine output; controlling motor output so that a total output of the motor output and the engine output becomes the driver's requested output; and when the driver's requested output is larger than input-available driving force to the input shaft of the automatic transmission, limiting the total output to a limitation output, which is smaller than or equal to the input-available driving force, wherein, when the total output is limited to the limitation output, controlling the motor output so that the total output of the motor output and the engine output becomes the limitation output.

BRIEF DESCRIPTION OF THE DRAWINGS

Embodiments of the invention will be described with reference to the drawings, wherein:

FIG. 2(B) is an operation table of the automatic transmission;

DETAILED DESCRIPTION OF PREFERRED EMBODIMENTS

Figure 1:
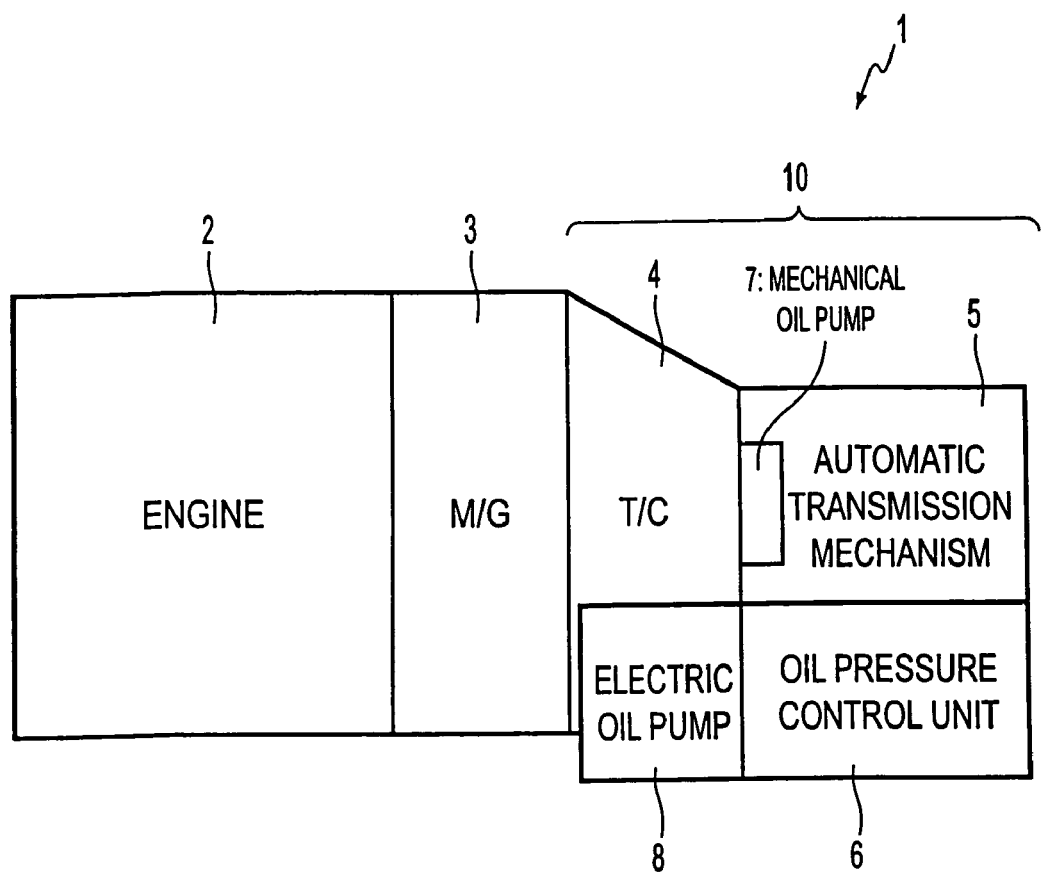
FIG. 1 shows a diagram of a drive system for a hybrid vehicle according to an embodiment of the invention.

As shown in FIG. 1, a driving source 1 includes an engine 2 and a motor generator (M/G) 3 (hereafter referred to as "motor"), and its driving force is output to an automatic transmission 10. The automatic transmission 10 comprises a torque converter (T/C) 4, which is one example of a fluid transmission unit, an automatic transmission mechanism 5, which is a multiple gear-change mechanism, an oil pressure control unit 6, a mechanical oil pump 7, and a electric oil pump 8. The automatic transmission mechanism 5 changes an input driving force, on the basis of a predetermined vehicle running condition, and outputs the changed driving force to, for example, a wheel axle. The automatic transmission mechanism 5 is provided with a plurality of friction engagement elements for performing gear changes, and the oil pressure control unit 6, which changes gears by controlling engagement of the friction engagement elements by oil pressure and controls the torque converter 4. The automatic transmission mechanism 5 is also provided with the mechanical oil pump 7 and the electric oil pump 8 to supply oil pressure to the oil pressure control unit 6. The mechanical oil pump 7 works with the engine 2 (and the motor 3) and is driven by the driving force thereof. On the basis of the revolution of the engine 2, oil pressure in the oil pressure control unit 6 is generated. The electric oil pump 8 is independent of the driving force of the engine 2 (and the motor 3) and is driven by a motor (not shown) for the electric oil pump 8, which is supplied with electric power from a battery. On the basis of the electric power (voltage), oil pressure in the oil pressure unit 6 is generated.

Figure 2A:
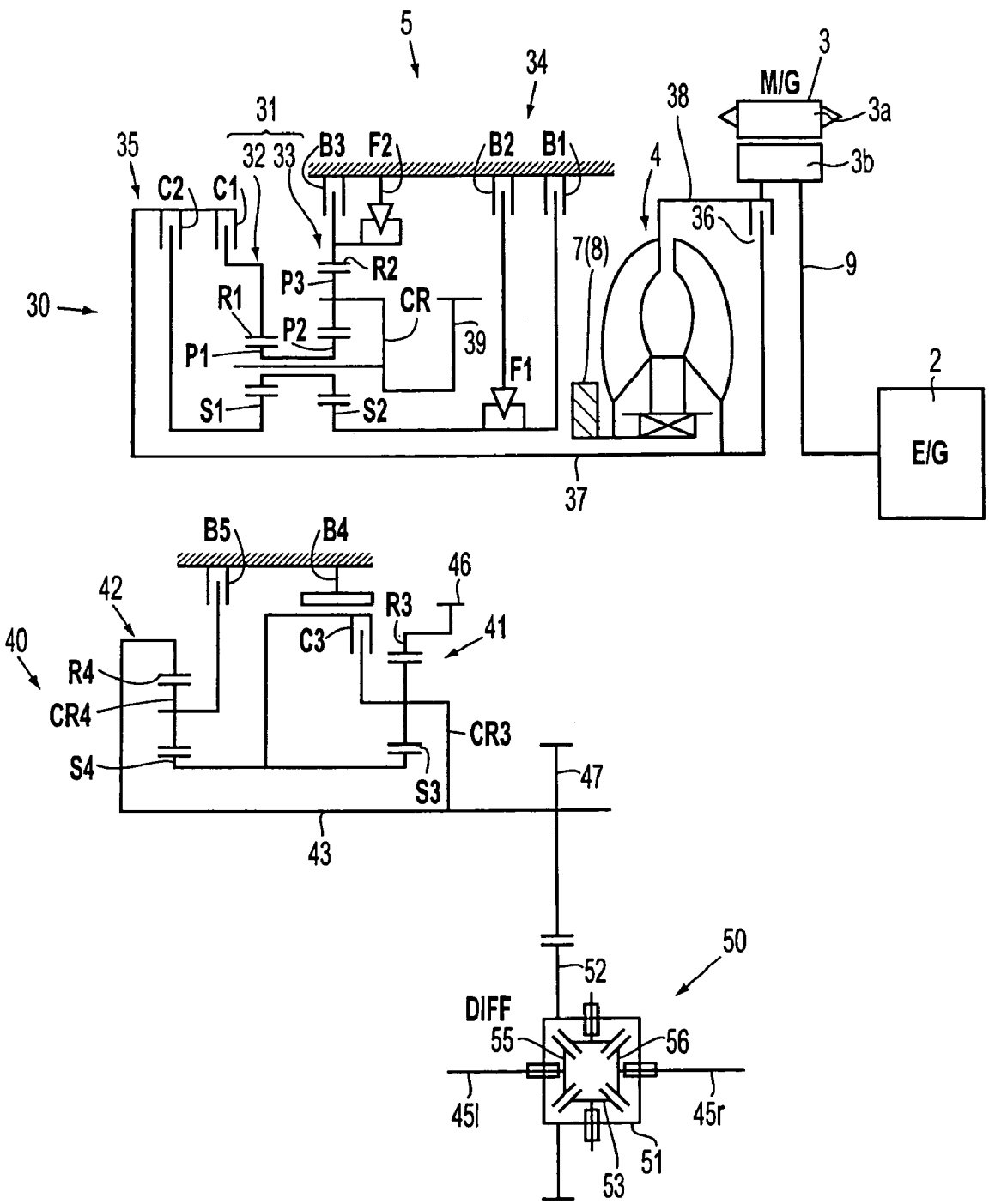
FIG. 2(A) is a schematic diagram of an automatic transmission, which is applied to the embodiment of the invention.

The automatic transmission mechanism 5 will now be described. As shown in FIG. 2(A), the motor 3 including a stator 3a and a rotor 3b is connected to a crankshaft (an engine output shaft) 9, to which a driving force of the engine 2 is output, by directly connecting the rotor 3b to the crankshaft 9. An input shaft 38 of the automatic transmission is connected to the crankshaft 9 and also connected to a turbine runner of the torque converter 4. The mechanical oil pump 7 is connected to the turbine runner. In other words, the driven revolution of the mechanical oil pump 7 works with the revolution of the engine 2 and the motor 3.

A main gear-change mechanism 30 is provided on a first shaft 37, which is arranged on the same axis as the engine output shaft (crankshaft 9). The driving force of the engine 2 and the motor 3 is transmitted to the first shaft 37 through a pump impeller of the torque converter 4. The torque converter 4 has a lock-up clutch 36. When the lock-up clutch 36 is engaged, the driving force of the engine 2 and the motor 3 is transmitted to the first shaft 37 through the lock-up clutch 36.

The mechanical oil pump 7, located adjacent to the torque converter 4, a brake portion 34, a planetary gear unit 31, and a clutch portion 35 are provided in order on the first shaft 37.

The planetary gear unit 31 comprises a simple planetary gear 32 and a double pinion planetary gear 33. The simple planetary gear 32 comprises a sun gear S1, a ring gear R1, and a carrier CR supporting pinions P1 meshed with the sun and ring gears S1, R1. The double pinion planetary gear 33 comprises a sun gear S2, a ring gear R2, and a carrier CR supporting pinions P2 meshed with the sun gear S2 and supporting pinions P3 meshed with the ring gear R2. The sun gear S1 and the sun gear S2 are rotatably supported by a hollow shaft, which is rotatably supported by the first shaft 37. The carrier CR is common to both planetary gears 32, 33. The pinions P1, P2, which mesh, respectively, with the sun gears S1, S2, are connected so that they rotate together.

The brake portion 34 includes a one-way clutch F1, a brake B1, and a brake B2, which are located radially outwardly from the one-way clutch F1. A counter drive gear 39 is connected to the carrier CR through a spline. A one-way clutch F2 is associated with the ring gear R2, and a brake B3 is located between the ring gear R2 and a case of the automatic transmission 10. The clutch portion 35 includes a forward clutch (hereafter, referred to "an input clutch") C1 and a direct clutch C2. The input clutch C1 is located at a radially outer side of the ring gear R1, and the direct clutch C2 is located between an inner side of a rotatable member and a flange portion connected to an end portion of a hollow shaft.

A subgear-change mechanism 40 is provided on a second shaft 43, which is arranged in parallel to the first shaft 37. The first shaft 37, the second shaft 43, and a third shaft, consisting of a differential shaft (right-and-left axles 45l, 45r), make a triangle in a side view. The subgear-change mechanism 40 includes simple planetary gears 41, 42. A carrier CR3 and a ring gear R4 are connected, and sun gears S3, S4 are connected, so as to make a Simpson-type gear train. Also, a ring gear R3 is connected to a counter driven gear 46, so as to make an input portion. The carrier CR3 and the ring gear R4 are connected to a reduction gear 47, so as to make an output portion. Further, an UD (under drive) direct clutch C3 is located between the carrier CR3 and a combined sun gear S3 (S4). The combined sun gear S3 (S4) can be stopped by a brake B4, and a carrier CR4 can be stopped by a brake B5. Thus, the subgear-change mechanism 40 obtains three forward gears.

A differential unit 50, serving as the third shaft, includes a differential case 51. A gear 52 meshed with the reduction gear 47 is fixed to the differential case 51. In the differential case 51, a differential gear 53 and side gears 55, 56 are meshed with each other and rotatably supported. The right-and-left axels 45l, 45r extend from the side gears 55, 56. Thus, rotation from the gear 52 is split on the basis of load torque, and transmitted to right-and-left front wheels.

Each of the clutches C1, C2, and C3, and the brakes B1, B2, B3, B4, and B5 has a oil pressure servo (not shown in the drawings), which is controlled, to be driven by the supply of oil pressure, by the oil pressure control unit 6. Each oil pressure servo has a piston to push plural friction plates, which are provided with clearance gaps between each of the plates when the clutches and the brakes are released. The engagement condition of the clutches and the brakes is achieved by pushing the piston against the friction plates with the supplied oil pressure.

The operation of the automatic transmission mechanism 5 will now be described using the operation table shown in FIG. 2(B) and FIG. 2(A). At a first speed (1st) state, the clutch C1, the one-way clutch F2, and the brake B5 are engaged. Thus, the main gear-change mechanism 30 becomes the first speed state, and the reduction rotation is transmitted to the ring gear R3 of the subgear-change mechanism 40 through the counter gears 39, 46. In the subgear-change mechanism 40, the carrier CR4 is stopped by the brake B5, and a first speed state is created. The reduction rotation of the main gear-change mechanism 30 is reduced further and transmitted to the axels 45l, 45r through the gears 47, 52 and the differential unit 50.

At a second speed (2nd) state, the clutch C1 is engaged and when the brake B2 is engaged, the engagement of the one-way clutch F2 is smoothly switched to the engagement of the one-way clutch F1, and the main gear-change mechanism 30 comes into the second speed state. Also, the subgear-change mechanism 40 is in the first speed state because of the engagement of the brake B5. Thus, the combination of the second speed state of the main gear-change mechanism 30 and the first speed state of the subgear-change mechanism 40 creates the second speed state of the automatic transmission 5 as a whole.

At a third speed (3rd) state, the main gear-change mechanism 30 remains in the second speed state as described above, in which the clutch C1, the brake B2, and the one-way clutch F1 are engaged. On the other hand, in the subgear-change mechanism 40, the brake B4 is engaged. Then, the sun gears S3, S4 are fixed and rotation from the ring gear R3 is output from the carrier CR3 as rotation of a second speed state. Thus, the combination of the second speed state of the main gear-change mechanism 30 and the second speed state of the subgear-change mechanism 40 creates the third speed state of the automatic transmission 5 as a whole.

At a fourth speed (4th) state, the main gear-change mechanism 30 remains in the second speed state as well, as described above, in which the clutch C1, the brake B2, and the one-way clutch F1 are engaged. On the other hand, in the subgear-change mechanism 40, the brake B4 is released and the UD direct clutch C3 is engaged. In this state, the ring gear R3 and the sun gear S3 (S4) are connected and both planetary gears 41, 42 directly rotate together. Thus, the combination of the second speed state of the main gear-change mechanism 30 and the third speed state (direct drive rotation) of the subgear-change mechanism 40 creates the fourth speed state of the automatic transmission 5 as a whole.

At a fifth speed (5th) state, in the main gear-change mechanism 30, the clutch C1 and the direct clutch C2 are engaged, and rotation of the first shaft 37 is transmitted to both the ring gear R1 and the sun gear S1. Thus, the planetary gear unit portion 31 directly rotate together. On the other hand, the subgear-change mechanism 40 remains in the third speed state as described above, in which the UD direct clutch C3 is engaged. Thus, the combination of the third speed state (direct drive rotation) of the main gear-change mechanism 30 and the third speed state (direct drive rotation) of the subgear-change mechanism 40 creates the fifth speed state of the automatic transmission 5 as a whole.

At a reverse speed (REV) state, the direct clutch C2, the brake B3, and the brake B5 are engaged. In this state, the main gear-change mechanism 30 creates reverse rotation and the subgear-change mechanism 40 creates the first speed state, wherein the brake B5 prevents the carrier CR4 from rotating in a reverse direction. Thus, the combination of the reverse speed state of the main gear-change mechanism 30 and the first speed state of the subgear-change mechanism 40 creates the reverse speed state of the automatic transmission 5 as a whole.

In FIG. 2(B), a triangle indicates an operation (i.e. an engagement) during engine braking. For example, in the first speed state, the brake B3, instead of the one-way clutch F2, is engaged and fixes a ring gear R2. In the second to fourth speed states, the brake B1, instead of the one-way clutch F1, is engaged and fixes the sun gear S2.

Figure 3:
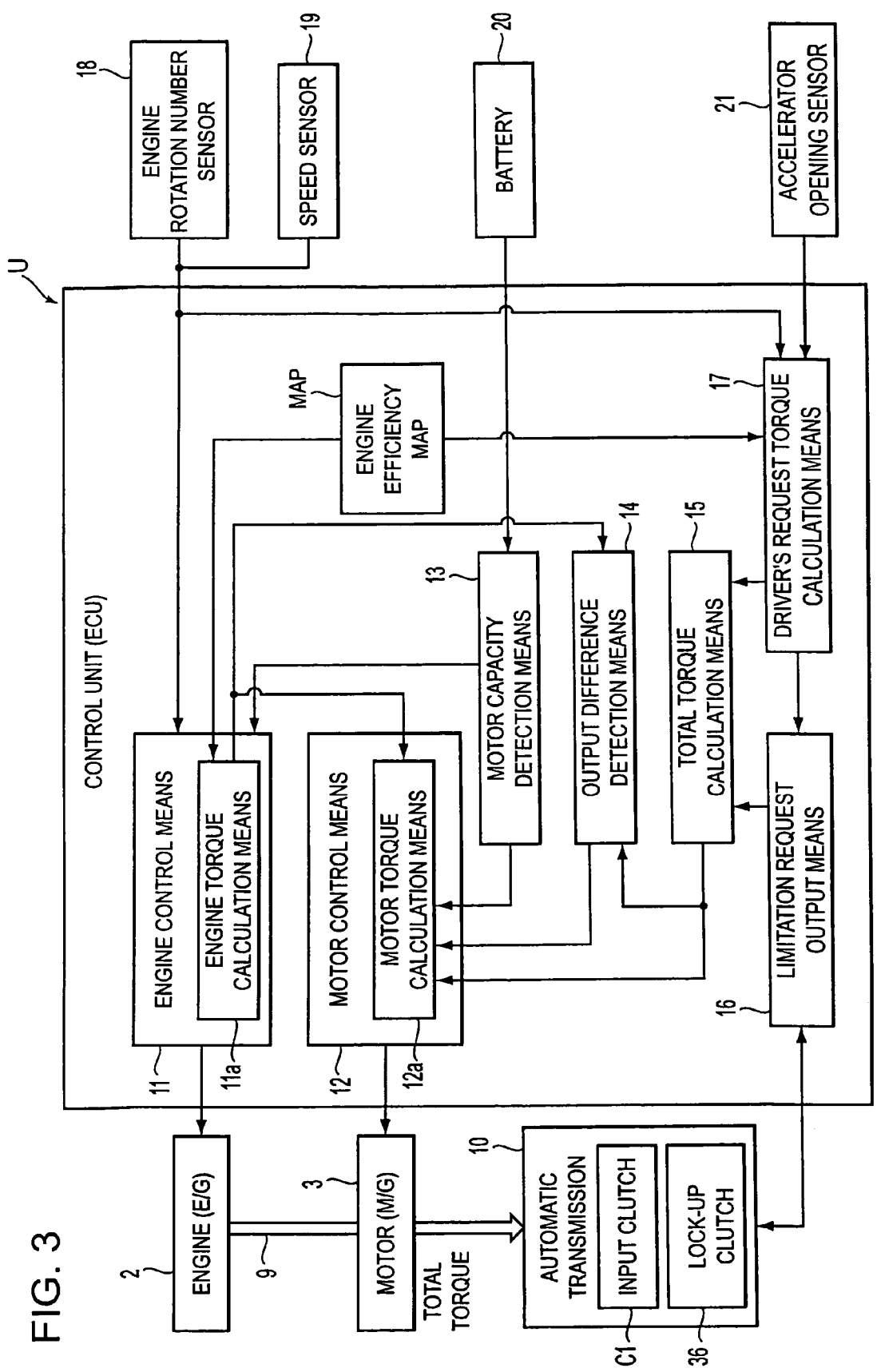
FIG. 3 shows a block diagram of a control device for a hybrid vehicle according to the embodiment of the invention.

The control device of a hybrid vehicle according to the embodiment of the invention will now be described with reference to FIG. 3. FIG. 3 shows a block diagram of a control device for a hybrid vehicle according to the embodiment of the invention. As shown in FIG. 3, the control device of a hybrid vehicle includes a control unit (ECU) U. The control unit U includes engine control means 11, engine torque calculation means 11a, motor control means 12, motor torque calculation means 12a, motor capacity detection means 13, output difference detection means 14, total torque calculation means 15, limitation request output means 16, driver's request torque calculation means (i.e. request output calculation means) 17, and an engine efficiency map Map.

The control device 1 of a hybrid vehicle also includes an engine rotation sensor 18 (or a speed sensor 19), connected to the engine control means 11 and the driver's request torque calculation means 17; a battery 20, connected to the motor capacity detection means 13; and an accelerator opening sensor 21, connected to the driver's request torque calculation means 17.

Figure 4:
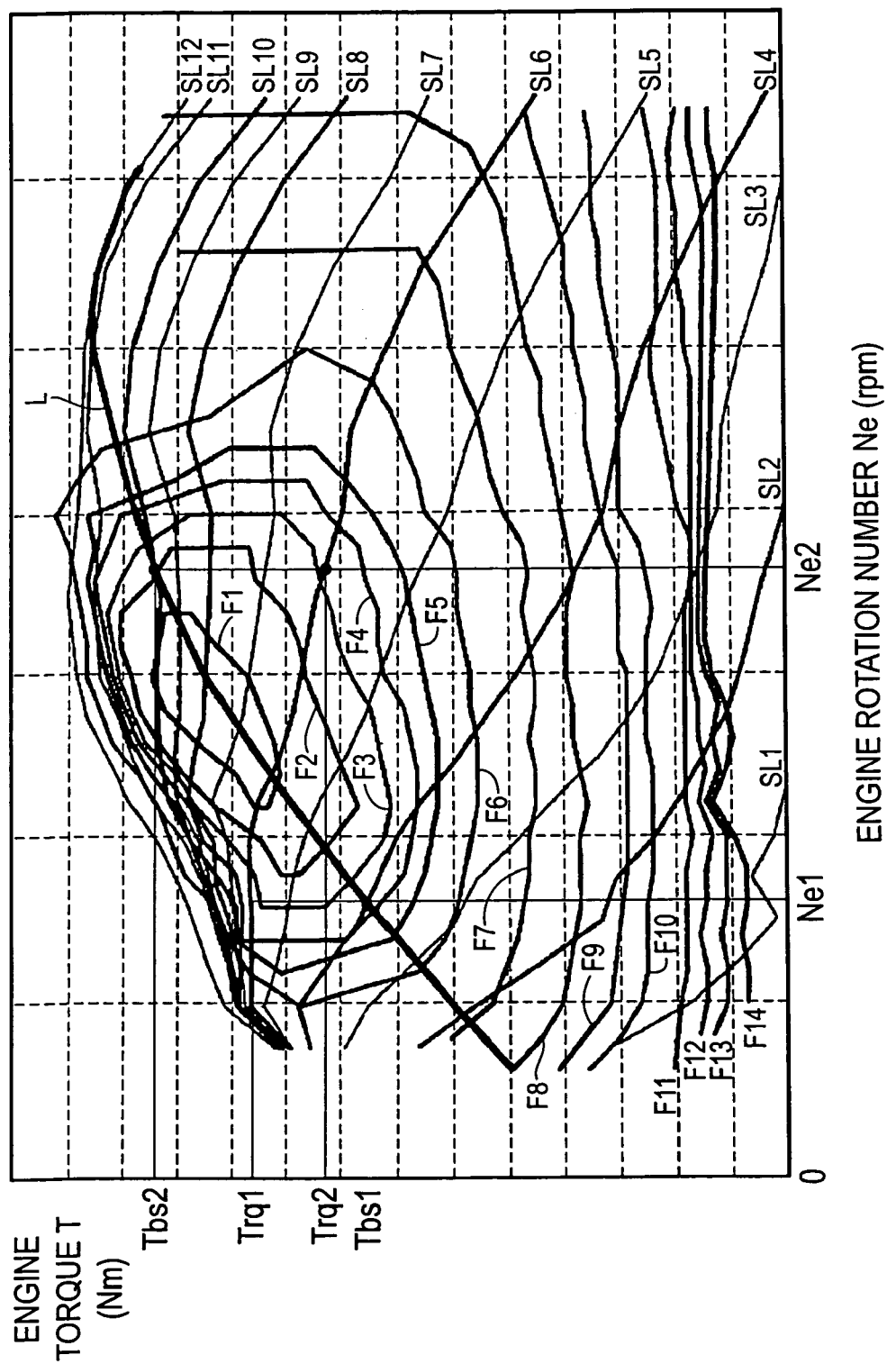
FIG. 4 shows an example of an engine efficiency map.

The engine efficiency map Map will be described with reference to FIG. 4. FIG. 4 shows one example of the engine efficiency map. As shown in FIG. 4, the engine efficiency map Map shows unique characteristics of an engine itself. The horizontal axis indicates engine rotation number Ne (rpm) and the vertical axis indicates torque T (Nm). Each of curved lines SL1 to SL12 indicates a different throttle opening (%). The larger the number of the curved line corresponds to the larger the throttle opening, and SL12 corresponds to 100% of the throttle opening.

Each of closed loops F1 to F14 is a contour line, which connect the same points of a fuel consumption rate (for example, g/(ps*h), i.e. how many grams of fuel are used, per horse power, per hour). The smaller the number of the closed loop corresponds to the smaller the fuel consumption rate, which means it is more fuel-efficient. Each of the loops F7 to F14 shows a partial loop due to the size of the drawing although they too are closed loops.

If the automatic transmission mechanism 5 is a multiple-step transmission mechanism as described above, the engine rotation number Ne is necessarily decided on the basis of vehicle speed at that time and a gear ratio of a gear speed (i.e. a first speed to a fifth speed, and a reverse speed). Therefore, the best fuel efficiency line L defines a relationship of the engine rotation number Ne to the engine torque Te, such that a smoothly output engine torque (i.e. engine output) Te changes in response to a change of engine rotation number Ne (i.e. a change of vehicle speed) and the best fuel efficiency is achieved. Thus, the engine 2 can output the engine torque Te in the most efficient condition at that time. Also, the engine torque Te can be changed by controlling a throttle opening of the engine 2 using electric throttle control.

Figure 5A:
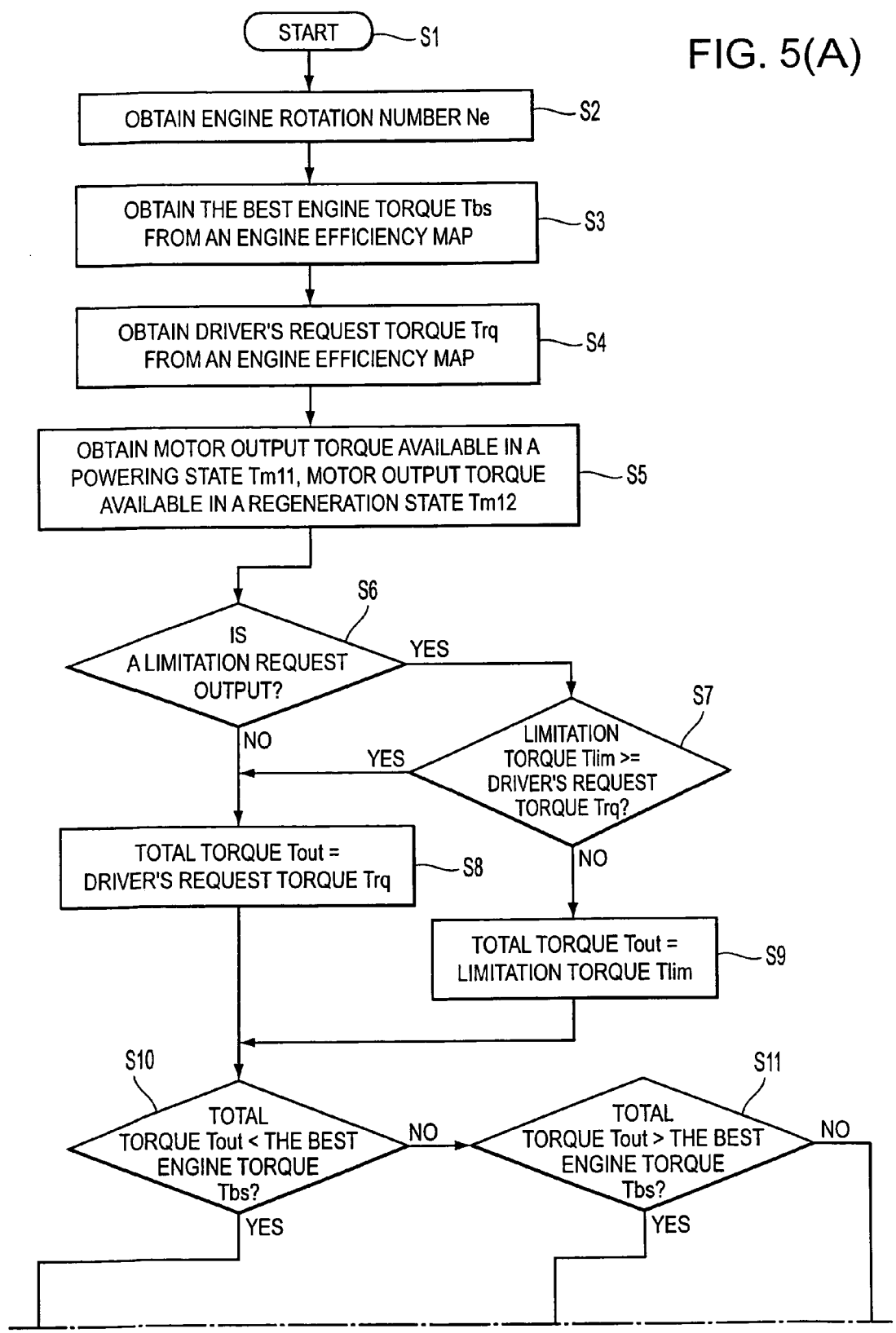
FIGS. 5(A) and 5(B) show a control flow chart for a control device for a hybrid vehicle according to the embodiment of the invention.
Figure 5B:
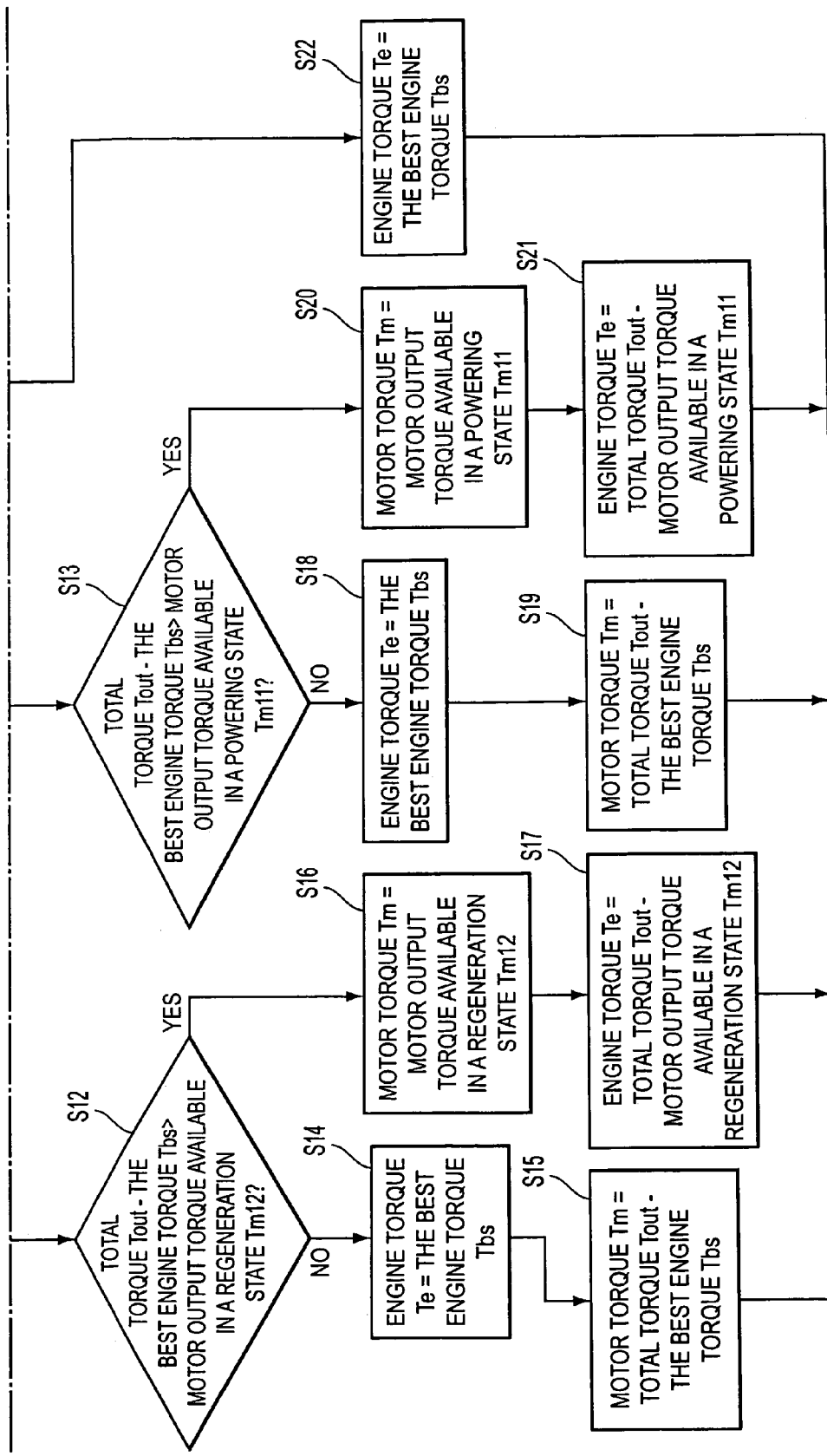

On the basis of the above-described structure, operations of the control device of a hybrid vehicle, according to the embodiment of the invention, will be described with reference to FIG. 5. FIG. 5 shows a flow chart of the control of the control device for a hybrid vehicle according to the embodiment of the invention.

When, a driver turns an ignition key (not shown) ON, the control of the control device is started (S1). Then, the engine control means 11 and the driver's request torque calculation means 17 obtain the engine rotation number Ne from the engine rotation sensor 18 (S2). The engine rotation number Ne can be also obtained by obtaining vehicle speed from a speed sensor 19 and calculating it from a gear ratio of the automatic transmission mechanism 5.

Then, the engine torque calculation means 11*a* of the engine control means 11 obtains (calculates) the best engine torque Tbs from the engine efficiency map Map (S3). The driver's request torque calculation means 17 obtains the driver's request torque (requested output) Trq from the engine efficiency map Map on the basis of an accelerator opening obtained from the accelerator opening sensor 21 (S4).

In detail, as shown in FIG. 4, for example, if engine rotation number is Ne1, the best engine torque Tbs1 is obtained from the above described best fuel consumption line L. If the accelerator opening is SL6, judging that a driver requests the output torque at the time when throttle opening is SL6, the driver's request torque Trq1 is obtained. Further, when vehicle speed increases and engine rotation number becomes Ne2, the best engine torque Tbs2 is obtained from the above described best fuel consumption line L. If the accelerator opening remains SL6, judging that a driver requests the output torque at the time when throttle opening is SL6, driver's request torque Trq2 is obtained.

Then, as shown in FIG. 5, the motor capacity detection means 13 obtains (detects) the torque Tm11, which can be output when the motor 3 is in a powering state, and the torque Tm12, which can be output when the motor 3 is in a regenerating state, on the basis of the remaining amount of charge of the battery 20 (SOC), its condition (e.g. temperature, SOH), and a capacity of motor 3 itself and the like (S5).

Then, the limitation request output means 16 determines if the driver's request torque Trq is larger than the torque which can be input to the automatic transmission 10 (i.e. the input-available torque). If the driver's request torque Trq is larger than the input-available torque, the limitation request output means 16 outputs a limitation request (signal) (S6). That is, in the normal running condition, the automatic transmission 10 is designed such that it can bear the maximum output of engine output 2 and motor output 3. However, the input-available torque sometimes decreases temporarily. Such occasions include, for example, a situation when a capacity of a clutch to transmit a driving force is reduced due to a torque amplification effect of a torque converter at the time of the start of the vehicle and due to a reduced oil pressure at the time of a low engine revolution; and a situation when a capacity of the lock-up clutch to transmit a driving force is reduced at the time of reducing a vehicle speed. In these situations, to protect the automatic transmission 10, a signal of the input-available torque is sent from the automatic transmission 10. The limitation request output means 16, which has received the signal, outputs a limitation request so that total torque (total output) Tout, as described later, becomes the input-available torque (or becomes less than the input-available torque). At the same time, the limitation request output means 16 sets limitation torque (limitation output) Tlim, on the basis of the signal of the input-available torque from the automatic transmission 10.

For example, in the step S6, if the limitation request output means 16 does not output the limitation request (No for S6), then step S8 is followed and the total torque calculation means 15 sets the driver's request torque Trq to the total torque Tout, which is obtained from the driver's request torque calculation means 17. Even if the limitation request output means 16 outputs the limitation request (Yes for S6), the total torque calculation means 15 determines if the limitation torque Tlim is larger than the driver's request torque Trq (S7). If the limitation torque Tlim is larger than the driver's request torque Trq (Yes for S7), the total torque calculation means 15 inputs the driver's request torque Trq as the total torque Tout, which is obtained by the driver's request torque calculation means 17 (S8).

On the other hand, if the limitation request output means 16 outputs the limitation request (Yes for S6) and the limitation torque Tlim is smaller than the driver's request torque Trq (No for S7), the total torque calculation means 15, as described above, to protect the automatic transmission 10, inputs the limitation torque Tlim, which is set by the limitation request output means 16, as the total torque Tout (S9).

As described above, after the total torque Tout is set, to either the driver's request torque Trq or the limitation torque Tlim, the motor torque calculation means 12*a* determines if the total torque Tout is smaller than the best engine torque Tbs, which is obtained by the engine torque calculation means 11*a* (S10). If the total torque Tout is smaller than the best engine torque Tbs (Yes for S10), i.e. if the motor 3 needs to regenerate energy because the best engine torque Tbs is high, the process proceeds to step S12.

In step S12, the motor torque calculation means 12*a* determines if a difference between the total torque Tout and the best engine torque Tbs is more than the motor output torque available in a regeneration state Tm12 (refer to S5), which is detected by the motor capacity detection means 13. In other words, the motor torque calculation means 12*a* determines if the above set total torque Tout can be obtained using regeneration by the motor 3. If it is possible (i.e. the difference is not larger than the motor output torque available in a regeneration state Tm12) (No for S12), the engine control means 11 controls the engine 2 to make the engine torque Te the best engine torque Tbs (S14).

The output difference detection means 14 detects (i.e. calculates) a difference between the total torque Tout (i.e. the limitation torque Tlim or the driver's request torque Trq) and the best engine torque Tbs. The motor torque calculation means 12*a* calculates the difference as motor torque (motor output) Tm, the motor control means 12 controls the motor 3 to the motor torque Tm (S15), and the process is returned (S23). In sum, by controlling the motor in a regeneration state, by the motor control means 12, on the basis of the difference between the total torque Tout and the best engine torque Tbs, the total torque Tout is output to the automatic transmission 10 in such a way that the motor torque Tm, being the regeneration torque, absorbs the excess engine torque Te, being the best engine torque Tbs.

Also, in S12, if the difference between the total torque Tout and the best engine torque Tbs is more than the motor output torque available in a regeneration state Tm12, which is detected by the motor capacity detection means 13, in other words, if the total torque Tout can not be obtained using regeneration by the motor 3 (Yes for S12), the motor torque calculation means 12*a* inputs the motor output torque available in a regeneration state Tm12 to the motor torque Tm and the motor control means 12 controls the motor 3 to the motor output torque available in a regeneration state Tm12 (S16).

The engine torque calculation means 11*a* calculates the difference between the total torque Tout and the motor output torque available in a regeneration state Tm12 as the engine torque Te, the engine control means 11 controls the engine 2 to the engine torque Te (S17), and this process is returned (S23). In sum, the total torque Tout is output to the automatic transmission 10 in such a way that the regeneration of the motor 3 is performed as much as possible and the total torque Tout is controlled by the engine 2. In this situation, the engine's condition becomes less than the best fuel efficiency line L by the amount that would exceed the regeneration output capacity of the motor 3. That is, protection of the automatic transmission comes before improvement in fuel efficiency.

On the other hand, in S10, if the total torque Tout is larger than the best engine torque Tbs (No for S10), then step S11 follows. In step S11, the motor torque calculation means 12a determines if the total torque Tout is larger than the best engine torque Tbs, which is obtained by the engine torque calculation means 11a. If the total torque Tout is larger the best engine torque Tbs (Yes for S11), in other words, if the motor 3 needs to be in a powering state because the best engine torque Tbs is too small, step S13 follows.

In step S13, the motor torque calculation means 12a determines if a difference between the total torque Tout and the best engine torque Tbs is more than the motor output torque available in a powering state Tm11 (refer to S5), which is detected by the motor capacity detection means 13. In other words, the motor torque calculation means 12a determines if the above set total torque Tout can be obtained by the powering the motor 3. If it is possible (i.e. the difference is less than the motor output torque available in a powering state Tm11) (No for S13), the engine control means 11 controls the engine 2 to make the engine torque Te the best engine torque Tbs (S18).

Then, the output difference detection means 14 detects (i.e. calculates) a difference between the total torque Tout (i.e. the limitation torque Tlim or the driver's request torque Trq) and the best engine torque Tbs. The motor torque calculation means 12a calculates the difference as motor torque (motor output) Tm, the motor control means 12 controls the motor 3 to the motor torque Tm (S19), and the process is returned (S23). In sum, by controlling the motor in a powering state by the motor control means 12 on the basis of the difference between the total torque Tout and the best engine torque Tbs, the total torque Tout is output to the automatic transmission 10 in such a way that the motor torque Tm, being the powering torque, assists the engine torque Te, being the best engine torque Tbs.

Also, in the step S13, if the difference between the total torque Tout and the best engine torque Tbs is more than the motor output torque available in a powering state Tm11, which is detected by the motor capacity detection means 13, in other words, if the total torque Tout can not be obtained by the powering of the motor 3 (Yes for S13), the motor torque calculation means 12a inputs the motor output torque available in a powering state Tm11 to the motor torque Tm and the motor control means 12 controls the motor 3 to the motor output torque available in a powering state Tm11 (S20).

Then, the engine torque calculation means 11a calculates the difference between the total torque Tout and the motor output torque available in a powering state Tm11 as the engine torque Te, the engine control means 11 controls the engine 2 to the engine torque Te (S21), and the process is returned (S23). In sum, the total torque Tout is output to the automatic transmission 10 in such a way that the powering of the motor 3 is performed as much as possible and the total torque Tout is controlled by the engine 2. In this situation, the engine's condition becomes more than the best fuel efficiency line L by the amount to exceed the powering output capacity of the motor 3. That is, the driver's requested output comes before the improvement of fuel efficiency.

If the total torque Tout is neither smaller nor larger than the best engine torque Tbs (No for S10, No for S11), the regeneration or the powering of the motor 3 is unnecessary and step S22 is followed. In step S22, the engine torque calculation means 11a inputs the best engine torque Tbs to the engine torque Te, and the engine control means 11 controls the engine 2 so that the engine torque Te becomes the best engine torque Tbs, and the process is returned (S23).

The above-described control, from step S1 to step S23, is performed repeatedly every small amount of time (for example, every 0.3 second). Thus, even though the engine rotation number Ne changes on the basis of the vehicle speed, the engine 2 can be driven with the best fuel efficiency to the greatest extent.

Figure 6:
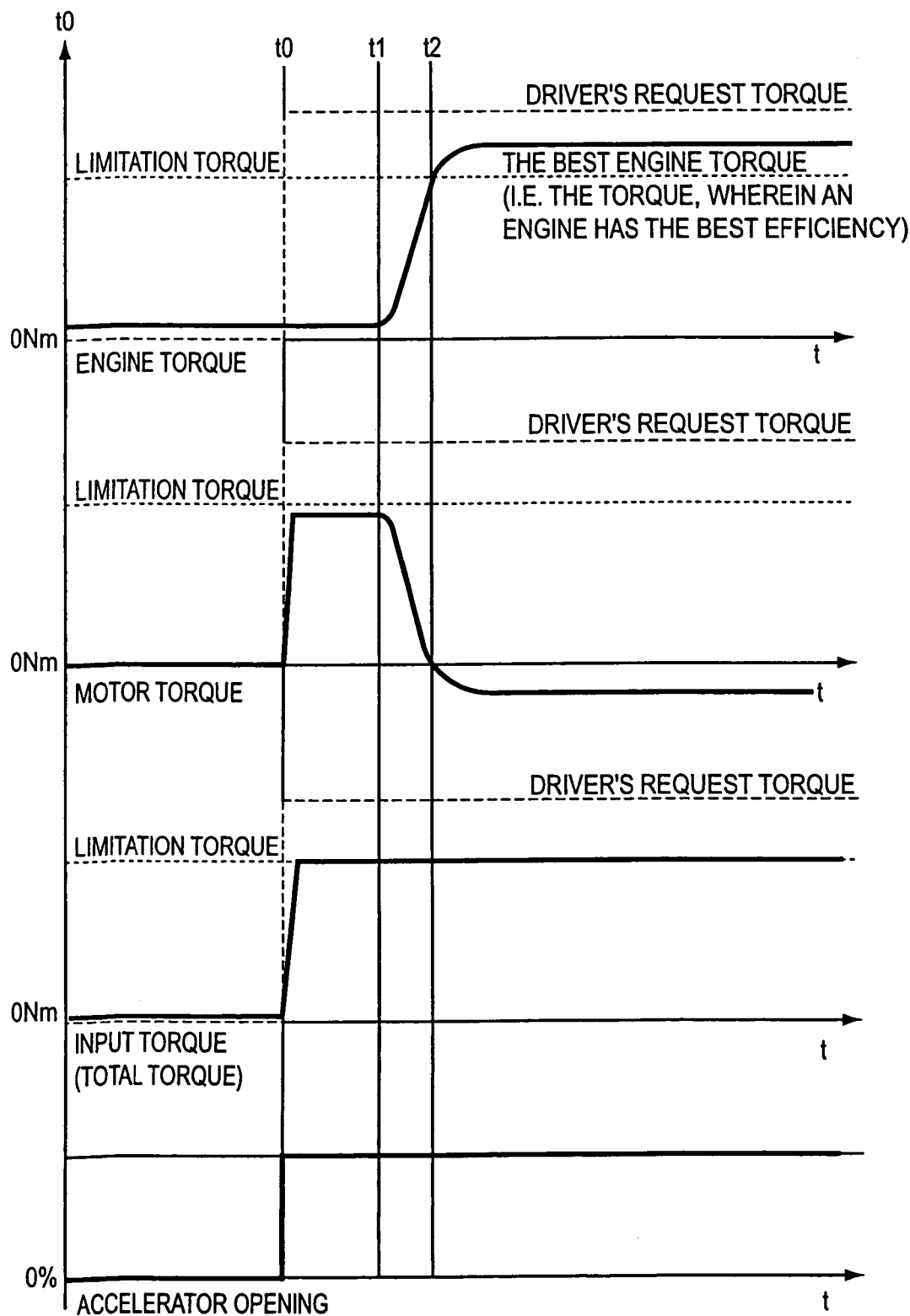
FIG. 6 shows a time chart when torque limitation, according to the embodiment of the invention, is performed.

The embodiment, where the torque limitation is performed, for example, when a vehicle is moving on the basis of the above-described control, will now be described with reference to FIG. 6. FIG. 6 shows a time chart when a torque limitation according to the embodiment of the invention is performed. In FIG. 6, the vertical axis indicates, from top to bottom, engine torque, motor torque, input torque (i.e. input torque to the automatic transmission, that is, total torque of engine torque and motor torque), and accelerator opening. The horizontal axis indicates time.

For example, from a point t0 to a point t1, the brake is engaged (ON) by the driver and the accelerator is released (OFF) (the accelerator opening is 0%). The vehicle stops and the engine 2 is in an idling state. At the point t1, when the driver releases the brake pedal and steps on the accelerator pedal by predetermined amount, the engine torque calculation means 11a obtains the best engine torque Tbs, which is based on the engine rotation number Ne (i.e. idling rotation number in this situation) in proportion to a vehicle speed for a gear ratio (S2, S3). Also, the driver's request torque calculation means 17 obtains the driver's request torque Trq (S4). Further, if the limitation request output means 16 detects that the driver's request torque Trq is larger than the input-available torque to the automatic transmission, the limitation request is output (S6, S7), and the total torque calculation means 15 inputs the limitation torque Tlim to the total torque Tout (S9).

The above-mentioned driver's request torque Trq, calculated by the driver's request torque calculation means 17 using the engine efficiency map Map, changes like the curved lines SL1 to SL12, which indicate throttle openings if the accelerator opening is constant as shown in FIG. 4. However, in the time chart shown in FIG. 6, the driver's request torque Trq is shown as constant for convenience of explanation.

Then, the motor torque calculation means 12a determines that the best engine torque Tbs is smaller than the total torque Tout (i.e. the limitation torque Tlim) (S11). The engine control means 11 uses the best engine torque Tbs as the engine torque Te, and controls the engine 2 so as to keep the engine 2 in the best fuel efficiency condition (S18). Also, the motor control means 12 inputs the difference between the total torque Tout and the best engine torque Tbs to the motor torque Tm and controls the motor 3 in a regeneration state (S19). In sum, the limitation torque Tlim is output by the engine 2 and the motor 3, and then the input torque of the automatic transmission 10 becomes the limitation torque Tlim.

When the limitation torque Tlim is output by the engine 2 and the motor 3 as described above, the vehicle speed starts to increase, for example, at a point t2. Then, the engine rotation number Ne starts to increase on the basis of a gear ratio of the automatic transmission 10. The best engine torque Tbs, based on the engine rotation number Ne, is obtained by the engine torque calculation means 11a (S3). Also, the engine control means 11 controls the engine 2 so that the engine torque Te becomes the best engine torque Tbs (i.e. so that the throttle opening increases gradually) (S18), and the engine torque Te is going to increase. Further, according to the increase of the engine torque Te, the motor torque calculation means 12a obtains the motor torque Tm, so that the total torque Tout becomes the limitation torque Tlim. The motor control means 12 controls the motor 3 in a regeneration state to the motor torque Tm (S19). In sum, the motor torque Tm gradually decreases according to the increase of the engine torque Te.

When the control is still continued so that the engine torque Te becomes the best engine torque Tbs according to the vehicle speed (engine rotation number Ne), the engine torque Te becomes larger than the limitation torque Tlim, for example, at a point t3 (S10). Then, in the same manner as described above, the engine control means 11 controls the engine 2 to the best engine torque Tbs (S14), and the output difference detection means 14 obtains the difference between the engine torque Te and the total torque Tout (i.e. the limitation torque Tlim). Also, the motor torque calculation means 12a calculates the motor torque Tm so as to regenerate the difference between the engine torque Te and the total torque Tout. Then, the motor control means 12 controls the motor 3 in a regeneration state with the motor torque Tm (S15). In sum, the amount of the engine torque Te, exceeding the limitation torque Tlim, is regenerated by the motor 3. And the total torque Tout, produced by the engine 2 and the motor 3, becomes the limitation torque Tlim and is output.

As described above, the embodiment, where the limitation is performed, for example, when a vehicle is moving, has been described along with FIG. 5. However, also in a situation, for example, when the capacity of a lock-up clutch to transmit a driving force is reduced at the time of reducing a vehicle speed, the total torque Tout of the engine torque Te and the motor torque Tm can be controlled to the limitation torque Tlim, by controlling the motor torque Tm by the motor control means 12. In this situation, if, for example, the engine torque Te is more than the limitation torque Tlim, and the engine torque Te has to be decreased to the limitation torque Tlim, delaying ignition timing of the engine 2, for example, is necessary. However, because, the engine control means 11 generally does not control the engine 2 limiting torque output Tout (except the case that the difference between the engine torque Te and the limitation torque Tlim exceeds the motor output torque available in a regeneration state Tm12), the motor control means 12 controls the motor torque Tm. Therefore, delaying ignition timing of the engine 2, for example, is not necessary.

As described above, in the control device of a hybrid vehicle according to the embodiment of the invention, the motor control means 12, when the limitation request output means 16 outputs the limitation request, controls the motor torque Tm so that the total torque Tout of the motor torque Tm and the engine torque Te becomes the limitation torque Tlim. Therefore, especially when the engine torque Te is more than the limitation torque Tlim, delaying ignition timing of the engine, for example, is not necessary. Thus, the total torque can be made less than the input-available driving force to the automatic transmission 10 to protect the transmission 10. Also, an adverse effect on auto emissions can be prevented.

Also, because the engine control means 11 controls the engine 2 so that the engine 2 operates at the best fuel efficiency condition, the fuel efficiency is improved. At the same time, because the total torque Tout of the engine torque Te and the motor torque Tm can be made the limitation torque Tlim, by the control of the motor control means 12, even when the engine torque Te is more than the limitation torque Tlim, the automatic transmission 10 can be protected and the engine 2 is controlled to the best fuel efficiency condition so that the fuel efficiency is improved.

Also, in a case when the engine torque Te becomes more than the limitation torque Tlim, the motor 3 is controlled in a regeneration state with the motor torque Tm, which is based on the difference between the engine torque Te and the limitation torque Tlim. Therefore, the motor 3 can charge a battery and also improve the fuel efficiency of the vehicle. Further, when the engine 2 is in the best fuel efficiency condition, the motor 3 can charge the battery efficiently.

Also, even in a case when the engine torque Te is smaller than the limitation torque Tlim, the motor 3 is controlled in a powering state so that the total torque Tout of the motor torque Tm and the engine torque Te becomes the limitation torque Tlim. Therefore, the automatic transmission 10 can be protected and it is possible to produce the output that substantially satisfies the driver's requested torque.

Additionally, the engine control means 11 controls the engine 3 so that, when the total torque Tout does not reach the limitation torque Tlim using the output-available capable driving force of the motor 3, which is detected by the motor capacity detection means 13 (i.e. the motor output torque available in a regeneration state Tm11 or the motor output torque available in a powering state Tm12), the total torque Tout can become the limitation torque Tlim. Therefore, even in a case where the total torque Tout does not reach the limitation torque Tlim using only the motor torque Tm, the total torque Tout can be always made reach to the limitation torque Tlim, when the limitation request is output.

Further, because the rotor 3b of the motor 3 is directly connected to the crankshaft 9, the motor torque Tm can be output to the crankshaft 9 more efficiently than compared to, for example, a type where a rotor of a motor is connected to a crankshaft through a chain.

Also, the automatic transmission 10 includes the multiple-step transmission mechanism 5, which changes the rotation of the input shaft 38 into, for example, five forward gear speeds and one reverse gear speed, and outputs the gear speeds to the wheel axels 45l, 45r. Therefore, the engine rotation number Ne changes on the basis of vehicle speed. However, the engine 2 is controlled on the basis of the engine efficiency map Map, so that the best fuel efficiency condition, corresponding to the engine rotation Ne at that time, can be achieved and also the total torque Tout is controlled using the motor torque Tm. Thus, the fuel efficiency is improved.

In the above-described embodiment according to the invention, the engine control means 11 controls the engine 2 so that the engine 2 can move to the best fuel efficiency condition on the basis of the engine rotation number Ne. However, not limited to the embodiment, the engine 2 can also be controlled on the basis of the accelerator opening (driver's request). That is, as long as the total torque is controlled, to become the limitation torque, using the motor 3, any way of controlling the output of the engine 2 can be applied.

Also, the above-described embodiment according to the invention has the rotor 3b of the motor 3 directly connected to the crankshaft 9 of the engine 2. However, not being limited to the embodiment, so long as the motor output is transmitted to the crankshaft of the engine, that is, as long as the engine output and the motor output are added together and input to the automatic transmission, any embodiment can be applied.

Also, the invention is not limited to the above-described embodiment in which the limitation request is output to protect the automatic transmission 10. The limitation request can also be output to protect other members or to prevent wheel spin.

Further, the invention is not limited to the above-described embodiment that the automatic transmission 10 includes the multiple-step transmission mechanism 5. The automatic transmission 10 can be a continuously variable transmission (CVT) (e.g. a belt-type, a toroydal-type), wherein the engine can be controlled in the best fuel efficiency condition and in the same manner as described above, and the motor can be controlled to obtain the limitation torque.

One possible advantage of some embodiments of the invention is that when the limitation request output means outputs the limitation request, the motor control means controls the motor output so that the total output of the engine output and the motor output becomes the limitation output. Therefore, for example, without performing a delay in the ignition timing of the engine, the total output can be made less than or equal to the input-available driving force to the automatic transmission. Thus, the automatic transmission can be protected and also an adverse effect on auto emissions can be prevented.

Another possible advantage is, because the engine control means controls the engine output so that the engine output becomes the best fuel efficiency condition, the fuel efficiency of the vehicle can be improved. At the same time, the motor control means controls the motor output, so that the total output of the engine output and the motor output becomes the limitation output, which is less than or equal to the input-available driving force, to the automatic transmission. Therefore, especially, even when the engine output becomes more than the limitation output, the automatic transmission can be protected and also the engine can be controlled to move to the best fuel efficiency condition. Thus, the fuel efficiency of the vehicle is improved.

Another possible advantage is, when the limitation request output means outputs the limitation request and the engine output is larger than the limitation output, the motor control means controls the motor in a regeneration state on the basis of the difference between the engine output and the limitation output, which is detected by the output difference detection means. Therefore, the amount of engine output, exceeding the limitation output, can be regenerated by the motor, and the total output can be made less than or equal to the input-available driving force to the automatic transmission. Thus, not only is the automatic transmission protected, but also the charge of the battery by the motor can be performed and the fuel efficiency can be improved.

Another possible advantage is, when the limitation request output means outputs the limitation request and the engine output is smaller than the limitation output, the motor control means controls the motor in a powering state, so that the total output of the motor output and the engine output becomes the limitation output. Therefore, the total output, so as to protect the automatic transmission and to meet the driver's requested output, can be output.

Another possible advantage is, when the total output does not reach the limitation output by the driving force which the motor can output as detected by the motor capacity detection means, the engine output is controlled, so that the total output becomes the limitation output. Therefore, even when the total output does not become the limitation output by only controlling the motor output, the total output, when the limitation request is output, can be always made the limitation output by controlling the engine output.

Another possible advantage is, because the rotor of the motor is directly connected to the engine output shaft, the motor output can be output efficiently to the engine output shaft.

Another possible advantage is, because the automatic transmission includes the multiple-step transmission mechanism, which can change the input shaft rotation number into multiple gear speeds and can output to the output shaft, the rotation of the engine and the motor can be changed and be output to the driving wheels. Also, in a type where the engine control means controls the engine output to the best fuel efficiency condition, the engine rotation number changes on the basis of vehicle speed. However, the engine is controlled so that the best fuel efficiency condition, corresponding to the engine rotation at that time, can be achieved and also the total output is controlled with the motor output. Thus, the fuel efficiency is improved.

What is claimed is:

1. A control device for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the control device comprising:
   a request output detection unit that detects a driver's requested output;
   an engine control unit that controls the engine output;
   a motor control unit that controls motor output so that total output of the motor output and the engine output becomes the driver's requested output; and
   a limitation request output unit that, when the driver's requested output is larger than input-available driving force to the input shaft of the automatic transmission, outputs a limitation request to limit the total output to a limitation output, which is smaller than or equal to the input-available driving force, wherein the motor control unit, when the limitation request is output by the limitation request output unit, controls the motor output so that the total output of the motor output and the engine output becomes the limitation output.

2. The control device for the hybrid vehicle of the claim 1, wherein the engine control unit controls the engine output so that the engine achieves a best fuel efficiency condition based on an engine rotation number.

3. The control device for the hybrid vehicle of the claim 2, wherein the control device further comprises an output difference detection unit that detects a difference between the engine output and the limitation output, wherein the motor control unit, when the limitation request is output by the limitation request output unit and the engine output is larger than the limitation output, controls the motor in a regeneration state on the basis of the difference between the engine output and the limitation output, detected by the output difference detection unit.

4. The control device for the hybrid vehicle of the claim 3, wherein the motor control unit, when the limitation request is output by the limitation request output unit and the engine output is smaller than the limitation output, controls the motor in a powering state so that the total output of the motor output and the engine output becomes the limitation output.

5. The control device for the hybrid vehicle of the claim 4, wherein the control device further comprises motor capacity detection unit that detects a driving force, which can be output by the motor, wherein the engine control unit, when the total output does not become the limitation output by the driving force, which can be output by the motor, detected by the motor capacity detection unit, controls the engine output so that the total output becomes the limitation output.

6. The control device for the hybrid vehicle of the claim 5, wherein the motor includes a stator and a rotor, the rotor directly connected to the engine output shaft.

7. The control device for the hybrid vehicle of the claim 5, wherein the automatic transmission includes a multiple-step transmission mechanism, which changes rotation of the input shaft into multiple gear speeds and outputs the gear speeds to the output shaft.

8. The control device for the hybrid vehicle of the claim 1, wherein the control device further comprises an output difference detection unit that detects a difference between the engine output and the limitation output, wherein the motor control unit, when the limitation request is output by the limitation request output unit and the engine output is larger than the limitation output, controls the motor in a regeneration state on the basis of the difference between the engine output and the limitation output, detected by the output difference detection unit.

9. The control device for the hybrid vehicle of the claim 8, wherein the motor control unit, when the limitation request is output by the limitation request output unit and the engine output is smaller than the limitation output, controls the motor in a powering state so that the total output of the motor output and the engine output becomes the limitation output.

10. The control device for the hybrid vehicle of the claim 9, wherein the control device further comprises motor capacity detection unit that detects a driving force, which can be output by the motor, wherein the engine control unit, when the total output does not become the limitation output by the driving force, which can be output by the motor, detected by the motor capacity detection unit, controls the engine output so that the total output becomes the limitation output.

11. The control device for the hybrid vehicle of the claim 1, wherein the motor control unit, when the limitation request is output by the limitation request output unit and the engine output is smaller than the limitation output, controls the motor in a powering state so that the total output of the motor output and the engine output becomes the limitation output.

12. The control device for the hybrid vehicle of the claim 1, wherein the control device further comprises motor capacity detection unit that detects a driving force, which can be output by the motor, wherein the engine control unit, when the total output does not become the limitation output by the driving force, which can be output by the motor, detected by the motor capacity detection unit, controls the engine output so that the total output becomes the limitation output.

13. A method for controlling a hybrid vehicle, the hybrid vehicle including a motor connected to an engine output shaft, to which an engine output is transmitted, and an automatic transmission, the automatic transmission including an input shaft connected to the engine output shaft, and an output shaft connected to a driving wheel, the method comprising:
identifying a request torque of an operator and a limitation torque of the automatic transmission;
determining an engine torque produced when the engine operates at a predetermined best torque based on engine speed;
calculating a difference between a lower torque of the request torque and the limitation torque and the predetermined best torque;
controlling a motor to provide additional torque when the best torque is less than the lower torque and a regeneration torque when the lower torque is greater than the best torque; and
adjusting the engine torque when a combination of best torque and the one of a maximum additional torque and a maximum regeneration torque of the motor can't provide the lower torque.

14. The method according to claim 13, wherein the adjusting step is accomplished by delaying ignition timing of the engine when the maximum regeneration torque of the motor cannot lower the best torque to obtain the lower torque.

15. The method according to claim 13, wherein the adjusting step is accomplished by increasing engine torque beyond the best torque when a sum of the best torque and the maximum motor torque are less than the lower torque.

16. A control method for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the method comprising:
detecting a driver's requested output;
controlling the engine output;
controlling motor output so that a total output of the motor output and the engine output becomes the driver's requested output; and
when the driver's requested output is larger than input-available driving force to the input shaft of the automatic transmission, limiting the total output to a limitation output, which is smaller than or equal to the input-available driving force, wherein, when the total output is limited to the limitation output, controlling the motor output so that the total output of the motor output and the engine output becomes the limitation output.

17. The control method for the hybrid vehicle of the claim 16, wherein controlling the engine output achieves a best fuel efficiency condition of the engine based on an engine rotation number.

18. The control method for the hybrid vehicle of the claim 16, further comprising detecting a difference between the engine output and the limitation output, wherein, when the engine output is larger than the limitation output, the motor is controlled in a regeneration state on the basis of the difference between the engine output and the limitation output.

19. The control method for the hybrid vehicle of the claim 16, wherein, when the engine output is smaller than the limitation output, the motor is controlled in a powering state so that the total output of the motor output and the engine output becomes the limitation output.

20. The control method for the hybrid vehicle of the claim 16, further comprising detecting a driving force which can be output by the motor, wherein when the total output does not become the limitation output using the motor output, further controlling the engine output so that the total output becomes the limitation output.

21. A control device for a hybrid vehicle, the hybrid vehicle including a motor, connected to an engine output shaft, to which an engine output is transmitted, and an automatic transmission, the automatic transmission including an input shaft, connected to the engine output shaft, and an output shaft, connected to a driving wheel, the control device comprising:

request output detection means for detecting a driver's requested output;

engine control means for controlling the engine output;

motor control means for controlling motor output so that total output of the motor output and the engine output becomes the driver's requested output; and limitation request output means for, when the driver's requested output is larger than an input-available driving force to the input shaft of the automatic transmission, outputting a limitation request to limit the total output to limitation output, which is smaller than or equal to the input-available driving force, wherein the motor control means, when the limitation request is output by the limitation request output means, controls the motor output so that the total output of the motor output and the engine output becomes the limitation output.

22. The control device for the hybrid vehicle of the claim 21, wherein the engine control means controls the engine output so that the engine achieves a best fuel efficiency condition based on an engine rotation number.

23. The control device for the hybrid vehicle of the claim 21, wherein the control device further comprises output difference detection means for detecting a difference between the engine output and the limitation output, wherein the motor control means, when the limitation request is output by the limitation request output means and the engine output is larger than the limitation output, controls the motor in a regeneration state on the basis of the difference between the engine output and the limitation output, detected by the output difference detection means.

24. The control device for the hybrid vehicle of the claim 21, wherein the motor control means, when the limitation request is output by the limitation request output means and the engine output is smaller than the limitation output, controls the motor in a powering state so that the total output of the motor output and the engine output becomes the limitation output.

25. The control device for the hybrid vehicle of the claim 21, wherein the control device further comprises motor capacity detection means that detects a driving force, which can be output by the motor, wherein the engine control means, when the total output does not become the limitation output by the driving force, which can be output by the motor, detected by the motor capacity detection means, controls the engine output so that the total output becomes the limitation output.

* * * * *